United States Patent
Stengel

(10) Patent No.: US 7,291,091 B2
(45) Date of Patent: Nov. 6, 2007

(54) METHOD FOR CLUTCH CONTROL, IN PARTICULAR, FOR PARALLEL GEARBOXES WITH WET CLUTCHES OR WET DUAL CLUTCHES

(75) Inventor: Frank Stengel, Buehl-Neusatz (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 232 days.

(21) Appl. No.: 11/162,222

(22) Filed: Sep. 1, 2005

(65) Prior Publication Data

US 2006/0052218 A1 Mar. 9, 2006

(30) Foreign Application Priority Data

Sep. 3, 2004 (DE) .................. 10 2004 042 643

(51) Int. Cl.
*B60W 10/02* (2006.01)
(52) U.S. Cl. ................ 477/17.4; 477/76; 477/98
(58) Field of Classification Search .......... 477/76, 477/97, 98, 174
See application file for complete search history.

(56) References Cited

U.S. PATENT DOCUMENTS

| | | | | |
|---|---|---|---|---|
| 5,050,451 A | | 9/1991 | Hussain | ............... 74/844 |
| 5,562,190 A | * | 10/1996 | McArthur | ............... 192/57 |
| 6,035,988 A | * | 3/2000 | Ito et al. | ............... 192/82 T |
| 6,117,048 A | * | 9/2000 | Toyama | ............... 477/180 |
| 6,139,467 A | | 10/2000 | Kosik et al. | ............... 477/76 |
| 6,149,547 A | * | 11/2000 | Oba et al. | ............... 477/154 |
| 2004/0112171 A1 | | 6/2004 | Kuhstrebe et al. | ......... 74/730.1 |

FOREIGN PATENT DOCUMENTS

| | | |
|---|---|---|
| DE | 196 39 376 | 3/1998 |
| DE | 198 23 772 | 12/1998 |
| DE | 101 28 856 | 5/2002 |
| EP | 0 479 464 | 4/1992 |
| JP | 05302631 A * | 11/1993 |
| JP | 11148385 A * | 6/1999 |

* cited by examiner

Primary Examiner—Ha D. Ho
(74) Attorney, Agent, or Firm—Simpson & Simpson, PLLC

(57) ABSTRACT

A method for clutch control for wet clutches includes the following steps: determining whether a viscosity of clutch fluid lies above a predetermine threshold value; when the determined viscosity is above the predetermined threshold value: adaptation of the clutch/gear control with respect to clutch/gear control for routine operation in such a manner that additional clutch energy will be transmitted to the clutch fluid and that the clutch fluid is heated by the additional energy; and checking to see whether the viscosity of the clutch fluid during the altered clutch control operation is above the threshold value and, if that threshold value is not reached, return to clutch/gear control for routine operation.

9 Claims, 1 Drawing Sheet

METHOD FOR CLUTCH CONTROL, IN PARTICULAR, FOR PARALLEL GEARBOXES WITH WET CLUTCHES OR WET DUAL CLUTCHES

CROSS-REFERENCE TO RELATED APPLICATIONS

This application claims priority of German Patent Application No. 10 2004 042 643.0, filed Sep. 3, 2004, which application is incorporated herein by reference.

FIELD OF THE INVENTION

This invention relates to a method for clutch control of wet clutches, in particular, wet dual clutches, for instance, for parallel gearboxes.

BACKGROUND OF THE INVENTION

Gear oil is present in the clutch cap in wet clutches or wet dual clutches; this means that in gears with such clutches, there is an additional drag moment that acts upon the gear input shafts. The drag moment depends on the viscosity of the gear oil. The viscosity of the gear oil, and thus the drag moment, increases greatly, especially at low temperatures as far as the customarily used gear oils are concerned, for example, in the so-called ATF (automatic transmission fluid) oils.

Such drag moments occur on account of low temperatures, for example, after protracted idle times in motor vehicles at low temperatures, and result in the fact that the dynamics of the gear will decrease in a subjectively perceptible fashion. That is expressed, for instance, in longer switching times. There are unknown measures to compensate for this effect that is brought about by the increased viscosities in clutch fluids.

DE 196 39 376 C1 discloses an automatically controlled clutch in the power train of a motor vehicle, where a regulating distance of a regulating unit is adapted for clutch actuation at high gear oil viscosities. Basically, the clutch is kept closed with an overpressure that is altered in analogy to the torque of the engine, that is to say, the pressure-applying spring elements are in each case so severely deformed that the frictional connection of the clutch will permit the transmission of a moment that will be placed by a limited measure above the particular engine moment. At low outside temperatures, this measure of overpressure is diminished in comparison to the normal state, as a result of which one can make sure that the clutch will be released quickly also at low temperature when it is recognized that the driver wishes to switch.

DE 198 23 772 A1 discloses a method for the compensation of increased viscosity of hydraulic fluid for the operation of an automated clutch. First of all, one determines a characteristic temperature, for example, an outside air temperature, cooling water temperature, suction air temperature, or some other temperature that is measured either directly or that is determined with the help of a mathematical model from other magnitudes. During movement of the transmitter piston in the clutch closing direction in a system consisting of transmitter and receiving cylinders, the comparatively viscous hydraulic fluid may possibly not flow quickly enough through a line between the transmitter cylinder and the receiver cylinder so that a pressure drop will build up in the working space of the transmitter cylinder. If the piston in the transmitter cylinder during its movement does not sweep over a shifting borehole, then there will be a change in the system volume, as a result of which the actuation accuracy of the clutch will suffer. As a remedy at low temperatures, movement speed of the transmitter piston in the clutch closing direction is changed toward the slower speeds. The slower speed suffices for the hydraulic fluid to flow through the line between the transmitter cylinder and the receiver cylinder so that no pressure drop will build up in the working chamber of the transmitter cylinder.

As an alternative, DE 198 23 772 A1 proposes that, at low temperatures when closing the clutch, one always runs over the shifting borehole of the transmitter cylinder so that the defined initial conditions will prevail during the next actuation cycle.

EP 0 479 464 B1 finally discloses a method for determining the viscosity of the gear oil where—instead of inserting a separate temperature probe for the measurement of a characteristic temperature—one records the gear sump lubricant viscosity from a slowdown of the rpm of the input shaft when the gear is on idle and the clutch is disengaged. The sump temperature, or a state that is called "cold/not cold," is determined from the known lubricant characteristics and the slowdown rate of the shaft.

SUMMARY OF THE INVENTION

The object of the invention is to develop a clutch control for wet clutches in such a way that the time interval during which a clutch control deviating from the routine clutch control is performed or during which there is a perceptible change in the switching time of the gear will be kept short.

This problem is solved with the present invention of a method for clutch control in wet clutches.

First of all, one determines whether the viscosity of the clutch fluid that, as a rule, is gear oil is above a predetermined threshold value. The threshold value, for instance, is so chosen that it will correspond to a viscosity that an average driver is unable to barely perceive as a more sluggish switching process. When this threshold value viscosity is exceeded, a clutch control is so executed that additional clutch energy will be transmitted into the clutch fluid in the form of heat so that heating will be accelerated. When the clutch control is active for temperatures with increased energy insertion into the clutch fluid, the temperature of the clutch fluid should be checked at least periodically. The moment the temperature has exceeded the threshold value or after the expiration of a period of time with changed clutch control after which one can expect the threshold temperature to be exceeded, the clutch control will then again be continued during routine operation.

In the following, reference will in each case be made to gear oil as a clutch fluid.

The idea behind the invention is to keep as short as possible the time during which the gear oil viscosity is clearly altered with respect to the normal state. Here one uses the fact that due to the clutch and the gear, energy is transmitted during operation to the gear oil in the form of heat. The invention uses this fact in that specifically targeted additional measures are taken when it is discovered that the viscosity of the gear oil is clearly increased, something that results in a faster temperature rise of the gear oil than usual.

The terms "routine operation," "normal state," "normal control," among other things, here refer to operation at normal temperatures, where the gear oil viscosity is not clearly increased. The actual temperature ranges for this kind of "routine operation" will depend on the gear oil that is used and its temperature behavior. In the case of the presently used gear oils, ranges within which an invention-based clutch control is used cover temperature of below −10° C. because, in this temperature range, the gear oil displays a highly increased viscosity in case of protracted idle times.

The gear oil temperature rise takes place essentially due to the transfer of clutch energy to the gear oil in that the clutch control is altered compared to routine operation. The energies that are transmitted by the gear or by the engine to the gear oil or the engine as usual contribute to normal heating but not to any accelerated heating at low temperatures. Clutch energy here is the kind of energy that is released by specifically targeted influencing of the clutch, in the form of heat, for example, clutch friction and clutch slippage, etc.

Just how long a clutch control that is altered when compared to routine operation can be upheld will depend on the special viscosity behavior of the gear oil. Clutch control operation is upheld for cold temperatures until the operating temperature of the gear oil has been obtained. As an alternative when already reaching a certain threshold temperature, there will be a switch to routine clutch operation because, at that time, there already occurs a drag moment that is clearly reduced when compared to the cold state with high viscosity.

Preferably, the viscosity of the gear oil is determined on the basis of a temperature, preferably the ambient temperature or the temperature of the gear oil. For this purpose, temperature is measured by a temperature sensor. As an alternative, it can also be determined by way of a computer model, as is described, for instance, in EP 0 479 464 B1.

In a preferred manner, the idle time of the vehicle is determined in addition because, even at very low temperatures (<−10° C.), but when the idle times of the gear oil are very short, residual heat is stored so that the gear oil will not display any clearly increased viscosity.

Preferably, a gear oil temperature is measured to test just how long the clutch control operation is to be maintained for low temperatures. In that way, one can determine the most precise time span during which one applies the clutch control operation that is altered when compared to routine operation.

As an alternative for an addition thereto, one can preferably specify that after expiration of a predetermined span of time, one switches to routine operation with a clutch/gear control that is adapted to low temperatures, that is to say, the altered clutch control is maintained at a maximum for a specified span of time.

The transmission of additional clutch energy to the gear oil in a preferred manner takes place by increasing the startup rpm, by prolonged slip phases when starting up, or by switching actions, or by switching over to a slip regulation characteristic that applies especially to low temperatures and that displays an increased slip rpm. Combinations of the mentioned measures are also possible. The use of a specially adopted slip regulation characteristic, especially for low temperatures, offers the advantage that, in addition to increased energy or heat injection into the gear oil, a better insulation of the combustion engine will be possible with regard to oscillations or impacts for the compensation of erratic running properties at low temperatures.

Basically, it suffices to provide one of the mentioned measures for the injection of clutch energy into the gear oil. An increase in the effect is achieved by a combination of the mentioned measures or other additional clutch control measures.

Prior to every start or during every start of a motor vehicle, one can ascertain whether the method is being implemented for clutch control at low temperatures. This check can be restricted to the winter months in that the viscosity of the clutch fluid is judged when an on-board computer determines that there is "winter," for instance, as a function of calendar data, or when the driver has activated a winter mode of the vehicle.

BRIEF DESCRIPTION OF THE DRAWINGS

The invention will be explained below with reference to the attached drawing labeled FIG. 1.

DETAILED DESCRIPTION OF THE INVENTION

Figure 1:
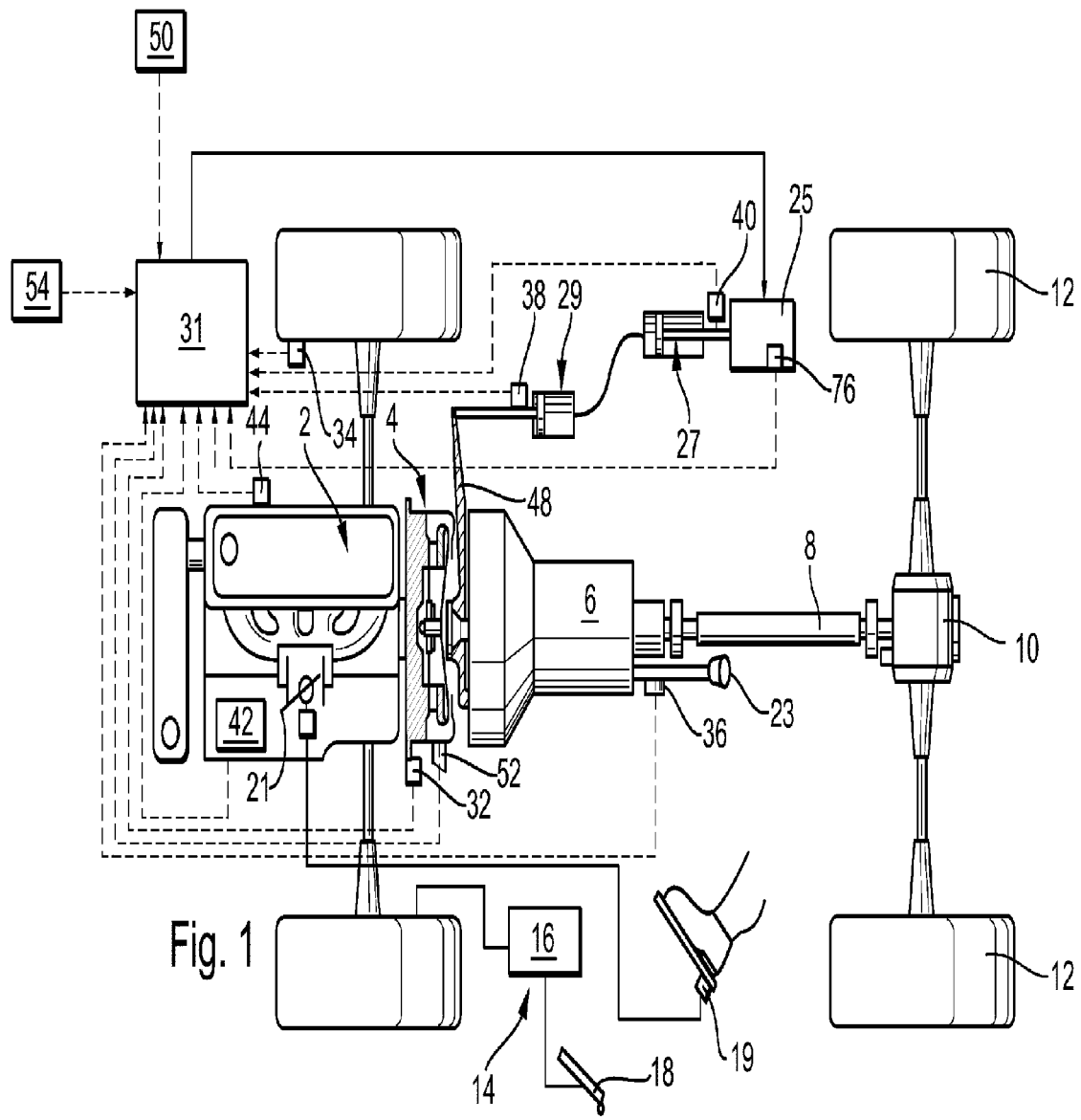
FIG. 1 shows a power train of a motor vehicle with a block diagram illustrating the clutch control device.

With reference to FIG. 1, the motor vehicle has an engine, for example, an internal combustion engine 2, which is connected via a clutch 4 with a gear, preferably a parallel gearbox 6. The gear drives the rear wheels 12 of the vehicle via cardan shaft 8 and a differential 10. A brake system 14 is provided with a brake unit 16 to brake the vehicle, which brake unit 16 is actuated via brake pedal 18. Although only the connection from brake unit 16 to the left front wheel is shown, it goes without saying that brake unit 16 cooperates with all wheels of the vehicle.

A drive pedal 19 is used to control the load of the internal combustion engine 2, which drive pedal triggers a throttle valve 21. Gear 6 is switched by means of a gearshift lever 23. Clutch 4 is automated and is actuated by an actuation unit, such as, for example, an actuator 25 via a transmitter cylinder 27 and a receiver cylinder 29. The clutch is preferably a wet dual clutch. Dual clutches are used, for instance, for parallel gearboxes. Wet clutches are those clutches that lie in the oil bath and are moved there. In a wet dual clutch 4, there are provided two clutch actuators and corresponding clutch triggers made up of transmitter cylinder/receiver cylinder (reference numbers 25, 27, 29), of which in each case only one element is illustrated in the drawing. Receive cylinder 29 cooperates with a clutch lever 48 that is rotated into its resting position by a clutch readjusting spring, not illustrated, in which resting position clutch 4 is completely locked, that is to say, it can transmit maximum moment.

Actuator 25 is triggered by a control unit, for instance, an electronic control unit 31 that contains a microprocessor and that receives data, for instance, from a sensor 32 for the rpm of the internal combustion engine, a sensor 34 for the acquisition of the wheel rpm of the vehicle, a sensor 36 for the acquisition of a switching desire by actuation of the gear lever 23, a sensor 38 for acquisition of the position of clutch 4, a sensor 40 for the position of actuator 25, a sensor 42 for the acquisition of the cooling water temperature and a sensor 44 for the acquisition of the temperature of the suction air.

In addition, the device has a determination unit in the form of a temperature sensor 50 to determine a temperature. The acquired temperature, for instance, is also supplied to the control unit 31 that triggers the clutch 4. Instead of acquiring the outside temperature via temperature sensor 50, the gear oil temperature can also be acquired by a sensor 52 or the gear oil temperature can be estimated from the rpm behavior of the gear shaft.

When the gear oil is very cold, for instance, when the outside temperature is below −10° C. and the vehicle is at a standstill for a longer period of time, something that is acquired by a clock generator 54 that cooperates with the ignition and that is passed on to control unit 31, the viscosity of the gear oil in which the wet clutch lies can be so increased that noticeable time delays will occur during switching. In that case, control unit 31, on the basis of the temperature acquired by the temperature sensor 50 and/or the temperature sensor 52 or some alternate device in conjunction with the vehicle idle times acquired by means of sensor 54, will determine the increased viscosity of the gear oil. The viscosity of the gear oil could also be acquired some other way, something which, however, would be expensive when compared to a temperature measurement and which is therefore not preferred.

When control unit 31 determines that there is an increased gear oil viscosity due to low temperatures, then it passes the clutch control for clutch 4 on to operation at low temperatures. In particular, an operating state is chosen where the clutch 4 will transmit additional clutch energy to the gear oil, for example, in the form of slide energy or due to friction energy generated by means of slippage. As a result, the gear oil, along with heating due to routine engine operation, is additionally heated by the energy that is transmitted by the clutch by way of the altered clutch control, something that results in a faster transition of the gear oil to lower viscosities. During altered operation, that is to say, during clutch control at lower temperatures as a result of temperature sensor 52, the control unit continues to acquire the gear oil temperature and, upon attainment of a gear oil temperature that corresponds to a tolerable lower viscosity or in case of a gear oil temperature that corresponds to the operating temperature, the unit will switch over to routine operation. Suitable measures that control unit 31 can initiate and monitor during altered clutch operation consist of the increase in the startup rpm, longer slip phases when starting and switching actions and/or the use of a slip regulating characteristic for clutch 4 that is set up especially for lower temperatures and has increased slip rpm. These measures are preferably controlled in a combined fashion by control unit 31.

LIST OF REFERENCES

2 internal combustion engine
4 clutch
6 gear
8 cardan shaft
10 differential
12 rear wheels
14 brake system
16 brake unit
18 brake pedal
19 drive pedal
21 throttle valve
23 gear shift lever
25 actuator
27 transmitter cylinder
29 receiver cylinder
31 control unit
32 sensor
34 sensor
36 sensor
38 sensor
40 sensor
42 sensor
44 sensor
48 sensor
50 temperature sensor
52 sensor
54 clock unit

What is claimed is:

1. A method for clutch control of wet clutches, comprising the following steps:
    (a) determining whether a viscosity of clutch fluid lies above a predetermined threshold value;
    (b) when the viscosity determined under step (a) is above the predetermined threshold value, adapting clutch/gear control with respect to clutch/gear control for routine operation in such a fashion that additional clutch energy is transmitted to the clutch fluid and that the clutch fluid is heated by the additional energy; and,
    (c) (after step (b)): checking to see whether the viscosity of the clutch fluid is still above the threshold value and, if the threshold value is not reached, return to clutch/gear control for routine operation.

2. The method according to claim 1, wherein the viscosity of the clutch fluid is determined on the basis of a temperature.

3. The method according to claim 2, wherein the viscosity of the clutch fluid is determined by means of an ambient temperature and a vehicle idle time.

4. The method according to claim 2, wherein temperature of the clutch fluid is measured during step (c).

5. The method according to claim 3, wherein temperature of the clutch fluid is measured during step (c).

6. The method according to claim 1, wherein in step (c), the expiration of a predetermined span of time with adapted clutch/gear control is used for checking.

7. The method according to claim 1, wherein in step (b), the clutch/gear control is adapted by increasing startup rpm.

8. The method according to claim 1, wherein in step (b), the clutch/gear control will be adapted by means of extended slip phases during startup and during gear shifting.

9. The method according to claim 1, wherein in step (b), the clutch/gear control is adapted by using a slip regulation characteristic for low temperatures, which characteristic displays increased slippage rpm.

* * * * *